(12) United States Patent
Quinta Cortiñas

(10) Patent No.: US 10,981,630 B2
(45) Date of Patent: Apr. 20, 2021

(54) FLOATING MOORING STRUCTURE

(71) Applicant: ESPAÑOLA DE PLATAFORMAS MARINAS, S.L., Pontevedra (ES)

(72) Inventor: Andrés Quinta Cortiñas, Pontevedra (ES)

(73) Assignee: Espanola de Plataformas Marinas, S.L.

( * ) Notice: Subject to any disclaimer, the term of this patent is extended or adjusted under 35 U.S.C. 154(b) by 0 days.

(21) Appl. No.: 16/342,985

(22) PCT Filed: Oct. 23, 2017

(86) PCT No.: PCT/ES2018/070026
§ 371 (c)(1),
(2) Date: Apr. 18, 2019

(87) PCT Pub. No.: WO2018/078210
PCT Pub. Date: May 3, 2018

(65) Prior Publication Data
US 2020/0055568 A1    Feb. 20, 2020

(30) Foreign Application Priority Data

Oct. 24, 2016  (ES) .................................. 201631366

(51) Int. Cl.
*B63B 21/00* (2006.01)
*B63B 59/02* (2006.01)
(Continued)

(52) U.S. Cl.
CPC .............. *B63B 21/00* (2013.01); *B63B 59/02* (2013.01); *A01K 61/54* (2017.01); *A01K 61/65* (2017.01); *B63B 2021/003* (2013.01)

(58) Field of Classification Search
CPC ... B63B 21/00; B63B 2021/003; B63B 59/02; B63B 73/00; B63B 73/20; B63B 73/40; B63B 75/00; B63B 2221/00; A01K 61/54
(Continued)

(56) References Cited

U.S. PATENT DOCUMENTS

| 436,644 A | * | 9/1890 | White | ...................... E02B 3/062 |
| | | | | 405/27 |
| 1,933,597 A | * | 11/1933 | McVitty | .................. B63B 35/50 |
| | | | | 114/262 |

(Continued)

FOREIGN PATENT DOCUMENTS

| ES | 1063493 U | 11/2006 |
| ES | 2387769 B1 | 10/2012 |
| KR | 200455681 Y1 | 9/2011 |

OTHER PUBLICATIONS

International Search Report for PCT/ES2018/070026, Prepared by the Spanish Patent Office, dated Apr. 3, 2018, 3 pages.

*Primary Examiner* — Daniel V Venne
(74) *Attorney, Agent, or Firm* — Breiner & Breiner, L.L.C.

(57) ABSTRACT

A floating mooring structure including a framework formed by a plurality of equidistant parallel tubes, a second plurality of tubes extending through the first plurality tubes and a third plurality of tubes extending through the first plurality spaced from and below the second plurality of tubes. The structure also includes peripheral berthing beams and additional flotation tanks with shock-absorbing fenders and with vent tubes that help stabilize the structure and serve as mooring posts for vessels.

5 Claims, 2 Drawing Sheets

(51) Int. Cl.
*A01K 61/65* (2017.01)
*A01K 61/54* (2017.01)

(58) Field of Classification Search
USPC ... 114/44, 45, 46, 77 R, 77 A, 88, 121, 123, 114/125, 230.1, 263–267
See application file for complete search history.

(56) References Cited

U.S. PATENT DOCUMENTS

| | | | | |
|---|---|---|---|---|
| 2,492,626 | A * | 12/1949 | Fletcher | B65D 19/0095 108/57.14 |
| 3,256,839 | A * | 6/1966 | Peterson | B65D 19/0073 108/56.1 |
| 3,654,877 | A * | 4/1972 | Barrett | B65D 19/0095 108/56.1 |
| 3,991,576 | A * | 11/1976 | Tazaki | E02B 3/062 405/21 |
| 5,067,418 | A * | 11/1991 | Carter | B65D 19/0073 108/56.1 |
| 5,272,990 | A * | 12/1993 | Carter | B65D 19/0073 108/51.3 |
| 5,816,172 | A * | 10/1998 | Carter | B65D 19/0095 108/51.3 |
| 8,851,793 | B2 * | 10/2014 | Cyr | E02B 3/062 405/27 |
| 9,556,573 | B2 * | 1/2017 | Betcher | E02B 3/062 |
| 9,902,474 | B2 * | 2/2018 | Quinta Cortinas | A01K 61/60 |
| 10,549,822 | B2 * | 2/2020 | Quinta Cortinas | B63B 3/04 |

* cited by examiner

FLOATING MOORING STRUCTURE

RELATED APPLICATION

This application is the U.S. national phase of PCT Application No. PCT/ES2018/070026 filed on Oct. 23, 2017, which claims priority to ES Patent Application No. P201631366 filed on Oct. 24, 2016, the disclosures of which are incorporated in their entirety by reference herein.

TECHNICAL FIELD

The invention relates to a floating mooring structure that is used in a marine environment. More particularly, the structure can be used as a single element, or in modular form, to create floating structures where vessels can berth and moor. The invention can be upgraded with suitable complements and accessories, for example, to create marine support platforms, or for storage, or for the transport of people and goods, or as a submersible platform for the fattening of molluscs, or it can be submerged with the aim of fattening the molluscs and then later being brought to the surface to harvest the production.

BACKGROUND

Floating structures already exist and are used as floating platforms that are anchored to the seabed and where vessels can berth. Some of these are used as supports for goods transport or they can have nets and/or cages added that hold marine species for fattening/growth. Other structures add beams and vertical ropes that hang in the water to which certain marine species adhere and grow, normally bivalve molluscs, such as mussels and oysters. Typically, such structures suffer from high levels of tension and compression from waves which break their components. At the same time, the structures are subjected to tensions from twisting and turning which cause flotation and stability problems along with cracks and fissures, frequently on the beams, which are normally the result of fatigue in the material from which they are made, and in the joints that connect the beams.

Document ES 2387769 shows this floating structure as being made up of a framework of tubes of varying diameters, where the tubes of smaller diameter are placed longitudinally on the structure and cross a semi-cylindrically shaped upper section of the larger diameter tubes that are placed transversally along the structure. In this structure, the line of flotation of the structure is lower, and the twisting motion that the tubes tend to be subjected to are compensated for by a downward movement coming from the load. Moreover, the stability of the structure is improved and, consequently, capsizing is avoided and the joints between the tubes offer a greater tolerance to breakage or tearing.

On this type of floating structures, particularly on those structures used as platforms for the cultivation of molluscs, the sides are used as berthing beams for vessels. During the berthing process, contact between the vessel and the structure occurs. Moreover, the different levels between the two floating bodies is magnified in stormy conditions, and repeated collisions mean that a large part of the molluscs being cultivated are dislodged. This requires a solution that absorbs the energy produced in these collisions with the aim of protecting the species being cultivated.

The risks of deformation or breakages when the kinetic energy from a vessel is absorbed are very frequent and damaging. Hence, these risks should be prevented with the addition of essentially limited elastic deformation systems, for example, shock-absorber type protection, tires or elastic padding, or other solid types of cushioning that are more voluminous, heavy and expensive.

SUMMARY

This type of structure requires improvements to their stability, to deal with tidal movements, and the berthing and mooring of vessels when the structures are used in open waters. Therefore, one objective of the invention is to improve the berthing and mooring of vessels to the floating structure, for example when used as a support platform and/or for the transport of people or goods and/or for the cultivation and fattening of marine species. Another objective of the invention is to improve even more the seaworthiness and stability of the floating structure when hit by waves so as to assure a greater floatability, whether the structure is carrying a load or not.

DETAILED DESCRIPTION

These and other goals are achieved with the proposed floating mooring structure, one that can be submerged and raised to the surface to aid the berthing and mooring of vessels on its periphery, whether it is moored to the seafloor or moving, and for example, it can be upgraded for use as a support platform for the transport of people and/or goods or converted into a platform for the cultivation and fattening of marine species, it can be towed or upgraded with marine engines for navigation but at the same time it is a platform that also has a high tolerance to adverse marine environments and maintains its floatability, with or without a load, so as to avoid capsizing.

Accordingly, a floating structure has been devised that uses conventional tubes for the framework. The tubes are made from plastic polymers or metallic alloys that are resistant to weathering. A first plurality of tubes is made up of multiple flotation tubes of the same diameter placed longitudinally in parallel, preferably equidistant, machined so that they have lines of holes along them in the upper semi-cylindrical section of their periphery. The lines of the holes along the tubes of said first plurality of flotation tubes face each other in such a way that the pairs of holes in the tubes are aligned with corresponding pairs of holes in the other tubes and, therefore, all the corresponding pairs of holes face each other on the tubes in the first plurality of tubes. These tubes are crossed by flotation tubes from a second plurality of tubes of a common diameter, although smaller in diameter than the diameter of the first tubes. The connection between the tubes helps to make the framework more rigid and to dissipate the vibrations that the up and down movement of the waves transmit to the structure. This also avoids a concentration of the tensions that tend to break the joints connecting the tubes. With such a layout, the structure's line of flotation is found towards the midline and the twisting movements that the tubes tend to be subject to are compensated for by the vertical downward force coming from the load, for example molluscs.

According to the invention, greater stability is given to the devised floating structure by adding a third plurality of tubes to the lower part of the structure as ballast. To achieve this, the tubes in the first plurality of tubes have pairs of holes aligned along the tubes on opposite sides of their periphery. The tubes in the third plurality are spaced vertically, extending longitudinally in parallel under the tubes of the second plurality of tubes, and are connected to each other by tubular spacers that allow an internal communication between the frame created by the second and third plurality of tubes. Each tube in the third plurality of tubes passes through corresponding pairs of holes facing the tubes at both ends of an imaginary line along a longitudinal axis of the tubes on the lower side of the structure in the first plurality of tubes, that is to say under a horizontal plane that divides the tubes into two semi-cylindrical sections.

The framework of flotation tubes includes a perimeter whose sides serve as berthing beams, that are preferably tubular, with a diameter and wall thickness strong enough to withstand the mechanical forces that they will be subject to. The berthing beams on at least two opposing sides of the perimeter have holes aligned where the ends of the tubes in the second and third pluralities of tubes can be connected, with the aim of achieving internal communication therebetween.

The floating mooring structure includes flotation tanks which are inserted, longitudinally spaced, on single berthing beams or on pairs of single berthing beams placed on at least two opposite sides of the structure. It is preferable that these flotation tanks are inserted vertically on the berthing beams and are a part of its peripheral wall and used as a stopper at the ends of the tubes of the first plurality of tubes that extend between the opposite sides of the structure, giving the structure greater strength.

Second flotation tanks are placed at the corners of the structure. The ends of the adjacent berthing beams are inserted in the tanks to fix them in place. These second flotation tanks, preferably placed vertically in the corners of the structure, are connected to the ends of the tubes of the first plurality of tubes via tubular extension tubes, where the connections help to make the structure more rigid.

With the aim of aiding in the making of unavoidable repairs to the structure, the corners of the structure can be made as independent corner pieces, that consist of the aforementioned second flotation tanks and tubular extensions that will be used for a subsequent connection, flanged or welded, to the ends of adjacent berthing beams and to the tubes at the ends of the structure in the first plurality of tubes.

These first and second flotation tanks and their positions in the structure prevent gaps from forming when vessels berth, preventing the vessels from crashing against the structure, thereby improving the maneuverability and stabilization of the berth. It includes shock absorbing fenders to lower the effects of the impact, for example rubber profiles, tires, etc., that cover, either totally or partially, the outside of the flotation tanks to protect the tanks when vessels berth. Moreover, the structure has smaller diameter tubes that are used as siphons or vent tubes that help to stabilize the structure against tidal currents, waves and the rising and falling movements of the structure with respect to water movements. These tubes are placed vertically above the tanks. The vent tubes can be made longer to make them useful as mooring posts.

The tubes used as vents also help to stabilize the floating structure when either submerged or raised, as well as in tidal currents and when hit by waves, as they extend inside the tubes of the first plurality of tubes. Although these tubes are shorter in length than the tubes used as mooring posts, they cross peripheral zones vertically opposite the tubes in the first plurality of tubes and are vertically centered with respect to the parts that connect the tubes with the second and third plurality of tubes and also contribute to a minimization of fatigue in the connections when subjected to the action of waves, avoiding twisting; displacements between the tubes and lowering the incidence of cracks and breakages in the welds between the joints.

It is obvious, as indicated above, that the structure can be upgraded for use as a platform for fattening molluscs by closing one part of the tubes, or all the tubes that make up the beams of the structure, using stoppers in the ends, which can be hydrodynamic or not, and/or by making compartments inside all or just a part of the tubes within the structure. The structure can even be provided with a valve system that allows water to be removed or let in permitting the selective flooding of the compartments so that the structure can be used as a submersible platform. It is also obvious that the structure can be upgraded for use with upright poles or other types of support for cultivation ropes, or with anchors or supports for the cages and nets that are employed for the fattening of molluscs or the structure can be made with gangways for workers, lateral berthing reinforcements, means of control, steering, stabilizing and/or leveling, and/or signals or other components typical on this type of platform. In certain cases, and with the aim of minimizing the possible effects of exposure to the environment, it would be advisable to put a protective covering on the surfaces of the structure, such as a resistant paint or something similar.

BRIEF DESCRIPTION OF THE DRAWINGS

An example of the embodiment of the floating mooring structure upgraded to a cultivation platform, but not limited to this, is shown in the accompanying drawings, where.

DETAILED DESCRIPTION

In a preferred embodiment of the invention, a floating mooring structure is essentially made up of plastic material that is highly resistant to the marine environment. In the proposed example, the structure is of made of low-density polyethylene.

Figure 1:
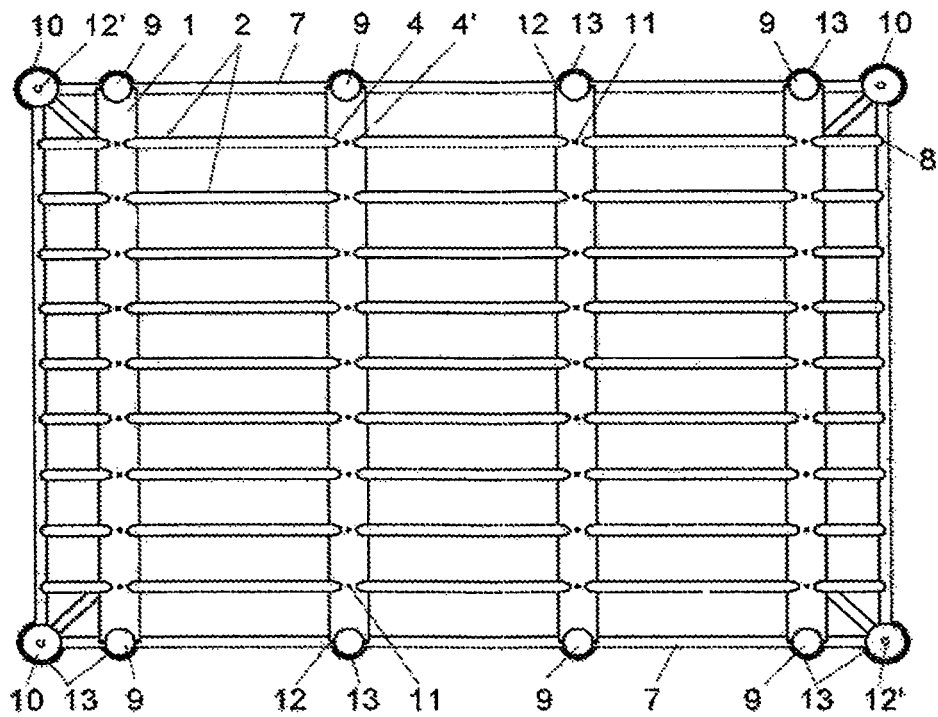
FIG. 1 is a plan view of the floating mooring structure.
Figure 3:
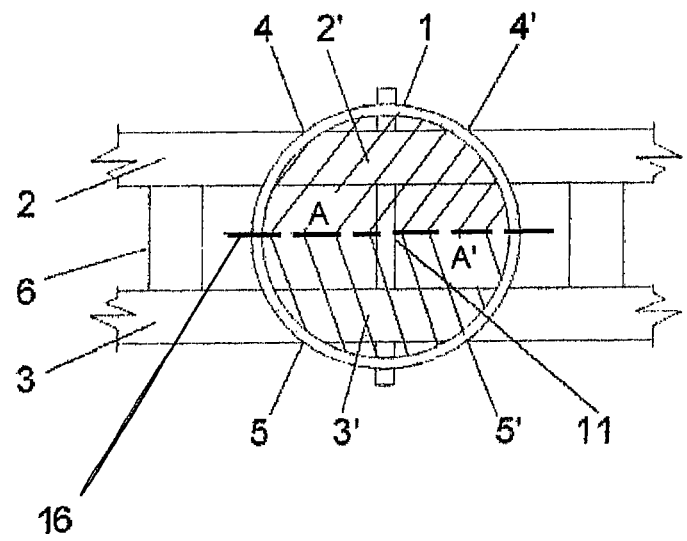
FIG. 3 illustrates, on a larger scale, a detail of the framework of tubes in the floating mooring structure.

Referring to FIG. 1, the rectangular floating mooring structure in the example is seen in plan view and has a first plurality of tubes (1) wherein the tubes have a diameter of between 800 mm-1200 mm, and are crossed by a second plurality of tubes (2) and, as is illustrated in FIG. 3, are also crossed underneath by the third plurality of tubes (3), which give the structure a greater stability when being towed. Both first and second pluralities of tubes (2) and (3) have a diameter that is significantly smaller, i.e., between 100 mm-350 mm.

As can also be seen in FIG. 3, each tube (1) in the first plurality of tubes (1) includes a plurality of pairs of holes that are aligned (4, 4') and (5, 5') that extend longitudinally on opposing sides, upper and lower, on the periphery of each tube (1). Vertically opposite, the pairs of holes (4, 4') and (5, 5') are arranged in such a way that the holes 4 and 5, just like holes 4' and 5', are also aligned and facing. The holes are equidistant in each pair (4, 4') and (5, 5'). Each pair of equidistant holes (4, 4') in the alignment of the pairs of holes (4, 4') present in the upper zone of each tube (1) is crossed by the second plurality of tubes (2). Each pair of equidistant holes (5, 5') in the alignment of the pairs of holes (5, 5') formed in the lower zone of each tube (1) is crossed by the third plurality of tubes (3), and fitted with parts for connection (2') and (3') for the tubes (2) and (3) on the inside of the tube (1) respectively. The respective ends of the connecting parts (2') and (3') are welded to the periphery of the holes (4, 4') and (5, 5') that cross above and below the tube (1) respectively, creating a single solid block in which the first plurality of tubes (1) are maintained longitudinally equidistant and parallel in relation to the tubes of the second (2) and third (3) plurality of tubes.

Each tube (3) in the third plurality of tubes (3) crosses the corresponding pairs of opposing holes transversally (5, 5') at both ends of an imaginary line that goes transversally along the longitudinal axis of the tubes (1) in the first plurality of tubes (1) at the lower part of the structure, that is, under the horizontal plane (16) that divides the tube (1) into two semi-cylindrical sections containing, respectively, the upper zone and the lower periphery zone of each tube (the two semi-cylindrical sections being shown by oppositely angled lines A, A' in FIG. 3). Moreover, each tube in the third plurality of tubes (3) can be seen extending longitudinally in parallel under a corresponding tube (2) in the second plurality of tubes (2) and the tubes (2) and (3) are connected by spacers (6), tubular in the example, to allow internal communication between the second plurality of tubes (2) and the third plurality of tubes (3), if this is desired.

The floating mooring structure includes, a frame made up of a first plurality of tubes spaced parallel to each other and bisected by a horizontal plane (16). The frame includes a second and third plurality of tubes crossing through the first plurality of tubes (1). A frame whose perimeter can be observed consisting of berthing beams (7) and (7') which, as can be seen in FIGS. 2 and 4 respectively, are an example of single berthing beams (7) or pairs of single berthing beams (7, 7'), upper (7) and lower (7'), both having alignments of holes (8) through which the corresponding a second and third plurality of tubes extend.

The ends of the second and third plurality of tubes (2) are connected in holes (8) aligned on single berthing beams (7) or in holes (8) on the upper berthing beams (7) on the pairs of opposing berthing beams (7, 7') on the perimeter are connected in such a way that there is internal communication between them all. The ends of the tubes are connected in holes (8) aligned on the lower beams (7'), located on the pairs of berthing beams (7, 7') on the perimeter for berthing.

Figure 2:
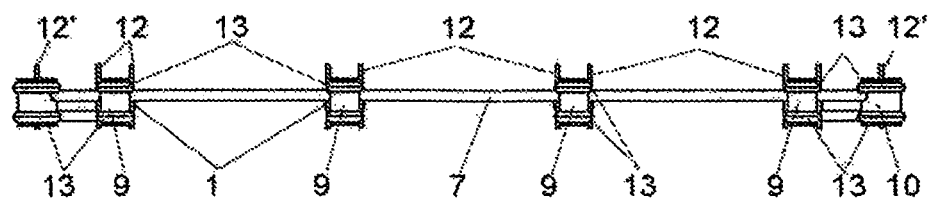
FIG. 2 is a side-view of the floating structure corresponding to FIG. 1.
Figure 4:
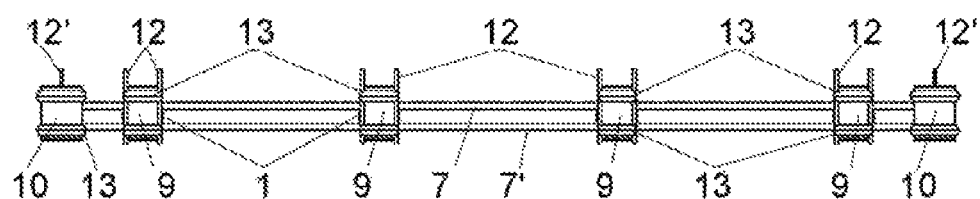
FIG. 4 illustrates, corresponding to FIG. 1, an additional example of the elevation of the floating structure with pairs of mooring beams.

The first flotation tanks (9) are located on the two opposing sides of the structure, inserted vertically and fixed equidistant from the berthing beams (7) as is shown in FIG. 2, or on pairs of berthing beams (7, 7') as can be seen in FIG. 4, they are fitted against the mouth end of the tubes (1) for connection and closing. Second flotation tanks (10), of a larger volume than flotation tanks (9), can be seen vertically on the corners of the structure connecting the ends of the berthing beams (7), (FIG. 2), or the ends of adjacent pairs of berthing beams (7, 7'), (FIG. 4), which are inserted into the interior of the tanks.

As is shown better in FIG. 3, vent tubes (11) centrally cross their respective connecting parts (2') and (3') of the tubes (2) and (3) inside the tubes and opposing peripheral zones in the tubes (1), strengthening the joint. The vent tubes (11) are extended vertically above the flotation tanks (9) and (10), their extra length is for use as mooring posts (12) and (12'). The mooring posts and vent tubes (12) are connected vertically on the periphery of the tanks (9), whereas the mooring posts and vent tubes (12') cross the flotation tanks (10) at the upper and lower bases.

Said first (9) and second (10) flotation tanks can be seen mounted with shock-absorbing fenders (13), in the example made with rubber profiles that surround part of the periphery.

Figure 5:
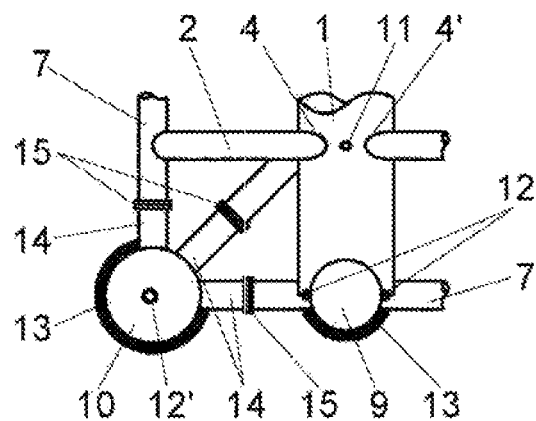
FIG. 5 illustrates an additional example of assembly that shows in partial detail a part of a corner and its connection to the floating mooring structure.

In an additional embodiment illustrated in a schematic manner in FIG. 5, the floating mooring structure shows corner sections that include flotation tanks (10) with tubular extensions (14) made up of connecting parts (15) for the creation of a subsequent joint that is flanged or welded to the berthing beams (7, 7') and the tubes (1) in the first plurality of tubes close to the structure.

The floating mooring structure can be upgraded to a mollusc cultivating platform and should be fitted with accessories needed to carry out these duties, for example, the addition of steering gear as well as stabilizers and levelers for control, such as compartments with inner walls on all or part of the tubes, a valve system for selective emptying and flooding, buoys for signaling, anchors and supports for nets and cages, or any other accessory typical on this type of platform.

The invention claimed is:

1. A floating mooring structure, comprising:
   a frame made up of a first plurality of tubes spaced parallel to each other and bisected by a horizontal plane, and of a second plurality of tubes, with each tube in the first plurality of tubes having pairs of holes aligned longitudinally opposite each other in a peripheral zone of a tube, each of the pairs of holes receive one of the second plurality of tubes crossing therethrough;
   first and second flotation tanks connected to perimeter berthing beams forming a perimeter framework extending about the floating mooring structure; and,
   a third plurality of tubes that extend in parallel under the second plurality of tubes which are kept apart by spacers that connect the second and third plurality of tubes to each other, the third plurality of tubes go through respective pairs of holes in the first plurality of tubes under the horizontal plane; wherein
   the first flotation tanks are located on at least two opposing sides of a perimeter of the floating mooring structure, connected to the first plurality of tubes; and
   each of the second flotation tanks are connected to two adjacent berthing beams which form a corner of the floating mooring structure.

2. The floating mooring structure, according to claim 1, wherein ends of the second plurality of tubes are connected in holes formed in the berthing beams on opposite sides of the floating mooring structure.

3. The floating mooring structure, according to claim 1, wherein the first and second flotation tanks make up shock-absorbing fenders spaced around at least part of the periphery of the floating mooring structure.

4. The floating mooring structure, according to claim 1, wherein the first plurality of tubes are provided with vertically extending vent tubes above each of the second plurality of tubes crossing through the first plurality of tubes.

5. The floating mooring structure, according to claim 1, wherein the first and second flotation tanks are provided with vertically extending vent tubes which act as mooring posts.

* * * * *